United States Patent
Tokunaga et al.

(10) Patent No.: US 10,327,317 B2
(45) Date of Patent: Jun. 18, 2019

(54) MOBILE WIRELESS TERMINAL

(71) Applicant: Murata Manufacturing Co., Ltd., Nagaokakyo-shi, Kyoto-fu (JP)

(72) Inventors: Tsuyoshi Tokunaga, Nagaokakyo (JP); Kenichi Ishizuka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 42 days.

(21) Appl. No.: 15/830,017

(22) Filed: Dec. 4, 2017

(65) Prior Publication Data

US 2018/0103531 A1 Apr. 12, 2018

Related U.S. Application Data

(63) Continuation of application No. PCT/JP2017/020889, filed on Jun. 5, 2017.

(30) Foreign Application Priority Data

Jun. 21, 2016 (JP) .................................. 2016-122687

(51) Int. Cl.
*H01Q 1/24* (2006.01)
*H05F 3/04* (2006.01)
(Continued)

(52) U.S. Cl.
CPC ................ *H05F 3/04* (2013.01); *H01Q 1/243* (2013.01); *H01Q 1/42* (2013.01); *H01Q 1/48* (2013.01);
(Continued)

(58) Field of Classification Search
CPC .......... H01Q 1/242; H01Q 1/243; H01Q 1/48; H01Q 5/335; H02H 5/04; H02H 3/26
(Continued)

(56) References Cited

U.S. PATENT DOCUMENTS 9,680,973 B2 * 6/2017 Na ........................... H01Q 1/38
2013/0207852 A1 8/2013 Nakano
(Continued)

FOREIGN PATENT DOCUMENTS

JP 2006-222798 A 8/2006
JP 5609922 B2 10/2014
(Continued)

OTHER PUBLICATIONS

Official Communication issued in International Patent Application No. PCT/JP2017/020889, dated Aug. 22, 2017.
(Continued)

*Primary Examiner* — Joseph J Lauture

(74) *Attorney, Agent, or Firm* — Keating & Bennett, LLP

(57) ABSTRACT

A mobile wireless terminal includes a metal casing, a printed wiring board disposed in the metal casing and including a ground conductor thereon, the ground conductor defining a ground plane for both a power supply circuit and an antenna, a capacitor connected to the metal casing and the ground conductor, and an overcurrent protective element connected to the metal casing and the ground conductor and having an operating voltage higher than a maximum instantaneous value of a commercial power supply voltage. A capacitance of the overcurrent protective element may be smaller than a capacitance of the capacitor. The capacitor may be a multilayer ceramic capacitor, and the overcurrent protective element may be a discharge gap overcurrent protective element.

9 Claims, 18 Drawing Sheets

(51) Int. Cl.
    *H01Q 1/42*     (2006.01)
    *H01Q 1/48*     (2006.01)
    *H01Q 9/04*     (2006.01)
    *H01Q 1/50*     (2006.01)
    *H04M 1/02*     (2006.01)
    *H01Q 9/42*     (2006.01)

(52) U.S. Cl.
    CPC .................. *H01Q 1/50* (2013.01); *H01Q 9/04* (2013.01); *H04M 1/0202* (2013.01); *H01Q 9/42* (2013.01); *H04M 1/0277* (2013.01)

(58) Field of Classification Search
    USPC ........... 343/702, 848, 850; 361/600, 103, 79
    See application file for complete search history.

(56) References Cited

U.S. PATENT DOCUMENTS

| | | |
|---|---|---|
| 2015/0340154 A1 | 11/2015 | Kim et al. |
| 2016/0301127 A1 | 10/2016 | Sonoda et al. |
| 2017/0005464 A1 | 1/2017 | Hwang et al. |

FOREIGN PATENT DOCUMENTS

| | | |
|---|---|---|
| JP | 2015-226052 A | 12/2015 |
| KR | 10-2008-0067917 A | 7/2008 |
| KR | 10-1585604 B1 | 1/2016 |
| WO | 2015/108140 A1 | 7/2015 |

OTHER PUBLICATIONS

Official Communication issued in Korean Patent Application No. 10-2017-7029882, dated Aug. 17, 2018.

\* cited by examiner

FIG. 12

| PIN | CONNECTION ELEMENT | CAPACITANCE (pF) | | | | | EVALUATION |
|---|---|---|---|---|---|---|---|
| | | INITIAL VALUE | 50 TIMES | 100 TIMES | 300 TIMES | 500 TIMES | |
| P1 | Cap (100pF,100V) | 100 | 90 | 70 | 36 | 36 | DEGRADED |
| P2 | Cap (100pF,100V) | 102 | 102 | 102 | 80 | 4 | DEGRADED |
| P3 | Cap (100pF,100V) | 102 | 102 | 102 | 94 | 86 | DEGRADED |
| P4 | Cap (100pF,100V) | 101 | 101 | 101 | 85 | 54 | DEGRADED |
| P5 | NOT APPLICABLE | - | - | - | - | - | - |

FIG. 13

| PIN | CONNECTION ELEMENT | CAPACITANCE (pF) | | | | | EVALUATION |
|---|---|---|---|---|---|---|---|
| | | INITIAL VALUE | 50 TIMES | 100 TIMES | 300 TIMES | 500 TIMES | |
| P1 | Cap (100pF,100V) | 100 | 100 | 99 | 100 | 100 | NORMAL |
| P2 | Cap (100pF,100V) | 102 | 102 | 102 | 102 | 102 | NORMAL |
| P3 | Cap (100pF,100V) | 100 | 100 | 100 | 100 | 100 | NORMAL |
| P4 | Cap (100pF,100V) | 102 | 102 | 102 | 102 | 102 | NORMAL |
| P5 | OCP | - | - | - | - | - | - |

MOBILE WIRELESS TERMINAL

CROSS REFERENCE TO RELATED APPLICATIONS

This application claims the benefit of priority to Japanese Patent Application No. 2016-122687 filed on Jun. 21, 2016 and is a Continuation Application of PCT Application No. PCT/JP2017/020889 filed on Jun. 5, 2017. The entire contents of each application are hereby incorporated herein by reference.

BACKGROUND OF THE INVENTION

1. Field of the Invention

The present invention relates to mobile wireless terminals, and particularly, to a mobile wireless terminal including a metal casing.

2. Description of the Related Art

A technique has been known in which a metal casing included in a mobile wireless terminal is used as a booster antenna. For example, Japanese Patent No. 5609922 discloses a technique that electrically connects a metal casing and a ground conductor on a printed wiring board such that good antenna characteristics are achieved.

When a charger that is insufficiently insulated from a commercial power supply is connected to a mobile wireless terminal including a metal casing, a voltage to ground may be applied to the metal casing and this may create a risk of electric shock.

Therefore, a mobile wireless terminal is to be provided, which is capable of maintaining good antenna characteristics over the long term while reducing the risk of electric shock.

SUMMARY OF THE INVENTION

Preferred embodiments of the present invention provide mobile wireless terminals that are capable of maintaining good antenna characteristics over the long term while reducing the risk of electric shock.

A mobile wireless terminal according to a preferred embodiment of the present invention includes a metal casing; a printed wiring board disposed in the metal casing and including a ground conductor thereon, the ground conductor defining a ground plane for both a power supply circuit and an antenna; a capacitor connected to the metal casing and the ground conductor; and an overcurrent protective element connected to the metal casing and the ground conductor and having an operating voltage higher than a maximum instantaneous value of a commercial power supply voltage.

When the metal casing and the ground conductor are electrically disconnected, an induced current that cancels out radio waves radiated from the ground conductor is produced in the metal casing by an electric field between the metal casing and the ground conductor, and antenna characteristics are significantly deteriorated. Good antenna characteristics are achieved by connecting the ground conductor and the metal casing with a lower impedance to allow more antenna current flowing through the ground conductor to be supplied to the metal casing.

With the configuration described above, where the metal casing and the ground conductor are connected by the capacitor, an impedance between the metal casing and the ground conductor is able to be set high for a leakage current of low frequency from the commercial power supply, and is able to be set low for an antenna current of high frequency. This allows the antenna current flowing through the ground conductor to be favorably transmitted to the metal casing, and good antenna characteristics to be achieved. Even if a leakage current flows from the commercial power supply into the ground conductor, since very little current is allowed to be transmitted to the metal casing because of the high impedance, the risk of electric shock is reduced.

However, if a surge voltage is repeatedly applied to the capacitor, the resulting degradation in capacitance leads to increased impedance to the flow of antenna current, and deteriorates the antenna characteristics. Also, the resulting short-circuit fault may cause a loss of the anti-electric shock function.

As a solution to this, the overcurrent protective element is provided to protect the capacitor from the surge voltage. The overcurrent protective element, which has an operating voltage higher than the maximum instantaneous value of the commercial power supply voltage, does not operate in response to leakage current from the commercial power supply. Therefore, it is possible to protect the capacitor from the surge voltage without impairing the anti-electric shock function, and to prevent capacitance degradation and short-circuit faults.

A mobile wireless terminal is thus provided, which is capable of maintaining good antenna characteristics over the long term while reducing the risk of electric shock caused by the leakage current.

A capacitance of the overcurrent protective element may preferably be smaller than a capacitance of the capacitor.

This configuration allows antenna current transmitted from the ground conductor to the metal casing to primarily flow to the capacitor. Generally, overcurrent protective elements are inferior in high-frequency characteristic (e.g., quality factor or Q value) to capacitors. This means that better antenna characteristics are able to be achieved by reducing the amount of antenna current flowing through the overcurrent protective element and increasing the amount of antenna current flowing through the capacitor.

The overcurrent protective element may preferably be a discharge gap overcurrent protective element including a pair of discharge electrodes in a ceramic body.

Since the overcurrent protective element of the discharge gap type is able to be configured as an ultra-low capacitance element (e.g., an element having a capacitance several orders of magnitude smaller than that of the capacitor), it is possible to protect the capacitor without deteriorating the antenna characteristics.

The capacitor may preferably be a multilayer ceramic capacitor including a plurality of pairs of internal electrodes in a ceramic body.

The multilayer ceramic capacitor is able be configured as a compact low-profile component and has high reliability and capacitance accuracy. Therefore, it is possible to achieve both good antenna characteristics and compactness.

In the ground conductor, the amount of antenna current flowing through a region to which the capacitor is connected may preferably be greater than or equal to the amount of antenna current flowing through a region to which the overcurrent protective element is connected.

In this configuration, the capacitor is disposed in the region where the amount of antenna current flowing therethrough is larger than or equal to that in the region where the overcurrent protective element is disposed. Since this allows the antenna current to be transmitted from the ground conductor to the metal casing primarily through the capacitor, it is possible to achieve good antenna characteristics.

The metal casing and the ground conductor may preferably be disposed opposite to each other. In the ground conductor, a region including a maximum point of antenna current is defined as a first region, a region including a path of the antenna current is defined as a second region, and the other region is defined as a third region. In this case, the capacitor may preferably be connected to the first region and a region in the metal casing opposite to the first region.

In this configuration, the capacitor connects the region in the ground conductor where antenna current is largest, to the metal casing. Since this allows the antenna current in the ground conductor to be efficiently transmitted to the metal casing, a larger amount of antenna current is supplied to the metal casing and good antenna characteristics are achieved.

A mobile wireless terminal according to a preferred embodiment may further include another capacitor, and this capacitor may be connected to the second region and a region in the metal casing opposite the second region.

In this configuration, the capacitor connects the region in the ground conductor where antenna current is large to the metal casing. Since this allows the antenna current in the ground conductor to be efficiently transmitted to the metal casing, a larger amount of antenna current is supplied to the metal casing and good antenna characteristics are achieved.

The overcurrent protective element may preferably be connected to the third region and a region in the metal casing opposite to the third region.

In this configuration, the overcurrent protective element connects the region in the ground conductor where antenna current is small, to the metal casing. The overcurrent protective element is thus able to protect the capacitor from a surge voltage without interfering with the capacitor arrangement designed to achieve good antenna characteristics.

An impedance between the metal casing and the ground conductor at a frequency of a current flowing through the antenna may preferably be lower than the impedance at a frequency of the commercial power supply voltage.

With this configuration, the antenna current flowing through the ground conductor is favorably transmitted to the metal casing, and good antenna characteristics are achieved. Even if a leakage current flows from the commercial power supply into the ground conductor, since very little current is allowed to be transmitted to the metal casing because of the high impedance, the risk of electric shock is reduced.

Preferred embodiments of the present invention provide mobile wireless terminals which are capable of maintaining good antenna characteristics over the long term while reducing the risk of electric shock caused by leakage current from the commercial power supply.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 shows a test result on a mobile wireless terminal according to a comparative example.

FIG. 13 shows a test result on a mobile wireless terminal according to a preferred embodiment of the present invention.

DETAILED DESCRIPTION OF THE PREFERRED EMBODIMENTS

Figure 1:
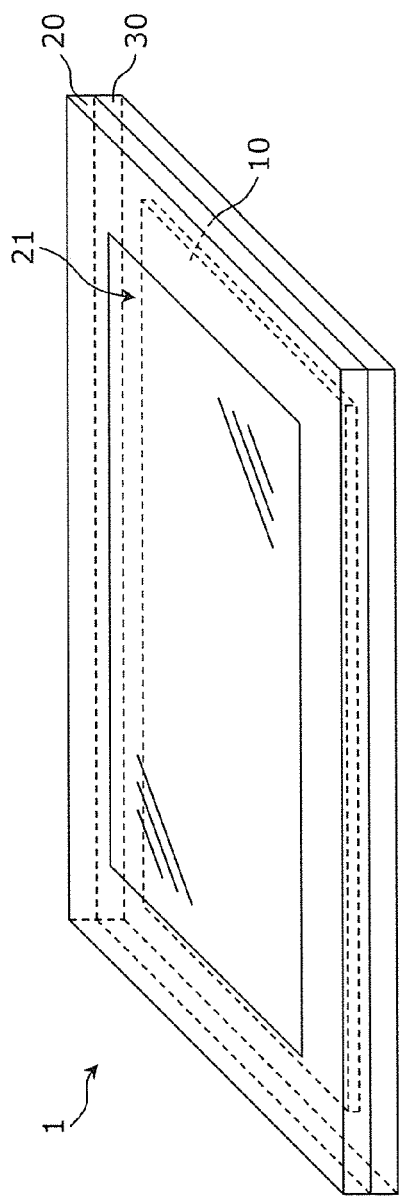
FIG. 1 is a perspective view illustrating an appearance of a typical mobile wireless terminal.

Preferred embodiments of the present invention will now be described in detail with reference to the drawings. The preferred embodiments described herein illustrate either general or specific examples. Numerical values, shapes, materials, elements, and the arrangement and modes of connection of the elements described in the following preferred embodiments are merely examples, and are not intended to limit the present invention. All of the elements and features, except those described in the independent claims, are optional. The sizes or the ratios between the sizes of the elements illustrated in the drawings are not strictly correct.

For preparation before describing the preferred embodiments of the present invention, the problem of electric shock will be described in detail using an exemplary mobile wireless terminal that the present inventors will refer to as a first comparative example. Then, by comparison with a second comparative example, the preferred embodiments of the present invention will be described in detail.

First Comparative Example

FIG. 1 is a perspective view illustrating an appearance of a mobile wireless terminal according to a first comparative example. As illustrated in FIG. 1, a mobile wireless terminal 1 is obtained by providing a printed wiring board 10 in a space defined by a resin casing 20 and a metal casing 30. A battery and a display panel (which are not shown) may also be provided in the same space.

The printed wiring board 10 includes thereon various circuits, such as a power supply circuit and a wireless circuit, for example, that provide the functions of the mobile wireless terminal 1. The resin casing 20 defines a front cover of the mobile wireless terminal 1, and includes a transparent window 21 which allows information displayed on the display panel to be seen therethrough. The metal casing 30 defines a back cover of the mobile wireless terminal 1. The metal casing 30 is supplied with antenna current (high-frequency signal current), and functions as a far-field communication antenna in conjunction with a ground conductor 12 on the printed wiring board 10.

Figure 2:
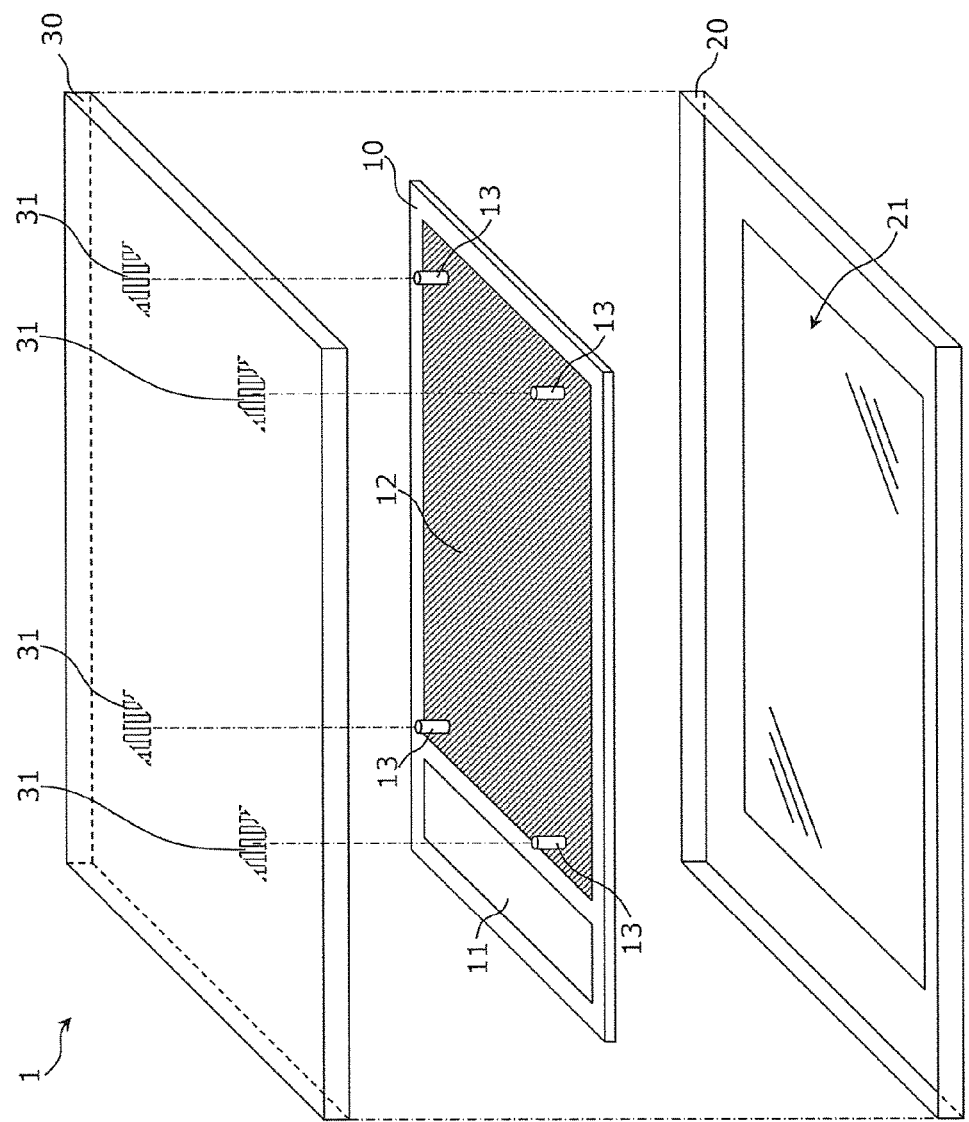
FIG. 2 is an exploded perspective view illustrating a structure of a mobile wireless terminal according to a first comparative example.

FIG. 2 is an exploded perspective view illustrating the structure of the mobile wireless terminal 1. In FIG. 2, the mobile wireless terminal 1 of FIG. 1 is shown upside down (i.e., face down). As illustrated in FIG. 2, a circuit block 11 including an RF circuit and the power supply circuit, the ground conductor 12, and contact pins 13 are disposed on the printed wiring board 10. On the bottom surface of the metal casing 30, contact pads 31 are arranged opposite to the respective contact pins 13. The contact pins 13 and the contact pads 31 are not particularly limited, but may be made of, for example, aluminum, copper, or an alloy of aluminum and copper.

The circuit block 11 may extend over both an inner layer and the opposite principal surface of the printed wiring board 10.

The ground conductor 12 defines a ground plane for both of the power supply circuit and the antenna. As the power supply circuit, the ground conductor 12 is structured and functions as a return path for a reference voltage and current of the power supply circuit, whereas as the antenna, the ground conductor 12 is supplied with antenna current from the RF circuit and provides a standing wave of the antenna current to radiate radio waves.

The contact pins 13 are secured to and electrically connected to the ground conductor 12 by a conductive bonding material, such as solder, for example. The contact pins 13 are brought into contact with the respective contact pads 31, with the resin casing 20 and the metal casing 30 joined together, to electrically connect the ground conductor 12 and the metal casing 30.

As described above, when the metal casing 30 and the ground conductor 12 are electrically disconnected, an induced current that cancels out radio waves radiated from the ground conductor is produced in the metal casing 30 by an electric field of the ground conductor 12, and the induced current interferes with the radiation of radio waves.

Therefore, the metal casing 30 and the ground conductor 12 are electrically connected, with the contact pins 13 and the contact pads 31 interposed therebetween. This allows a current flowing in the same direction as the antenna current flowing through the ground conductor 12 to be supplied to the metal casing 30, and good antenna characteristics to be achieved.

A configuration for electrically connecting the metal casing 30 and the ground conductor 12 is not limited to the example illustrated in FIG. 2. For example, the contact pads 31 may be removed if the contact pins 13 are able to be directly and favorably brought into contact with the metal casing 30. In a manner opposite to that illustrated in FIG. 2, the contact pins 13 may be arranged on the metal casing 30 and the contact pads 31 may be arranged on the ground conductor 12. Either one or both of the contact pins 13 and the contact pads 31 may be defined by elastic metal pieces biased toward each other.

The mobile wireless terminal 1 configured as described above has a problem of electric shock caused by leakage current from the commercial power supply, as described above.

Figure 3:
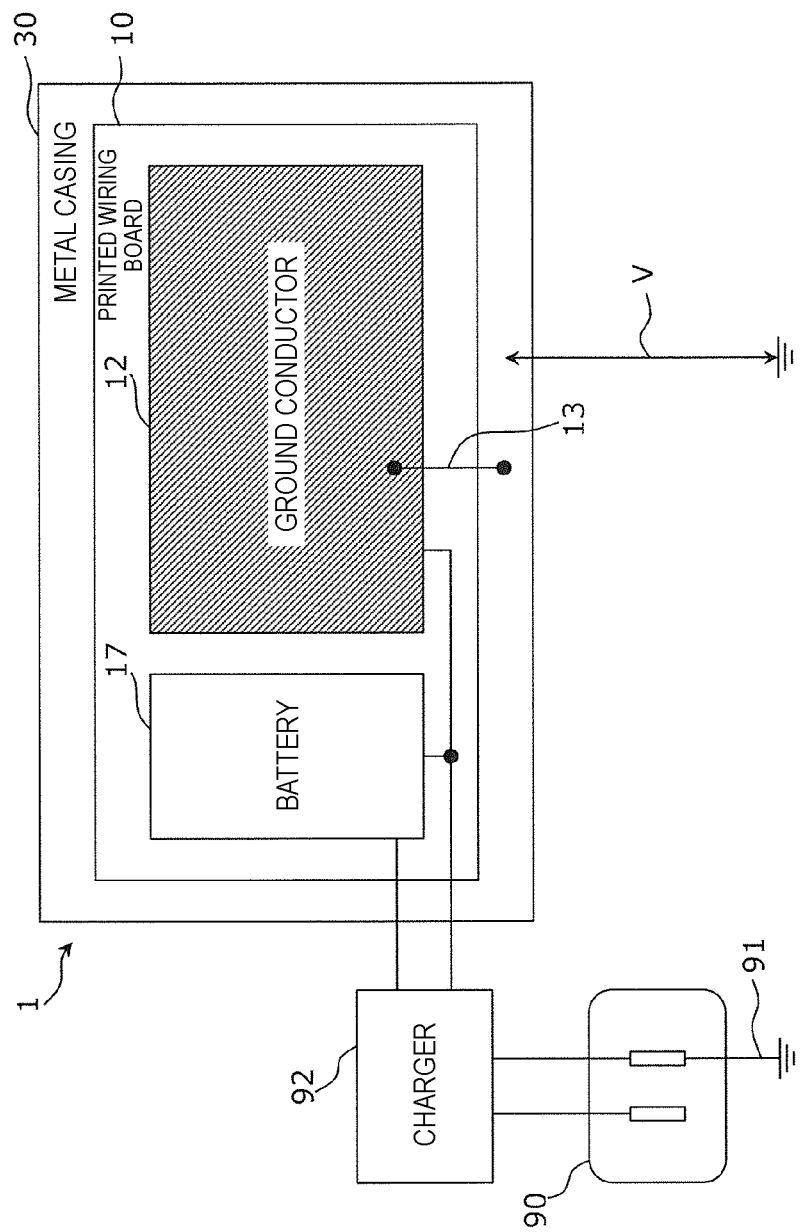
FIG. 3 is a diagram for explaining a problem with the mobile wireless terminal according to the first comparative example.

FIG. 3 is a diagram for explaining the problem with the mobile wireless terminal 1 in detail. As illustrated in FIG. 3, assume that a charger 92 is connected to the mobile wireless terminal 1, and a battery 17 is charged from a commercial power supply 90 through the charger 92. Here, the commercial power supply 90 refers to a single-phase alternating current voltage supplied from a household outlet to the charger 92. The effective voltage and the frequency of the commercial power supply 90 vary from one country to another. For example, in Japan, the effective voltage is 100 V and the frequency is 50 Hz or 60 Hz. Globally, a single-phase alternating current voltage with an effective value of up to about 240 V is supplied as the commercial power supply 90. One terminal 91 of the commercial power supply 90 is grounded.

In the mobile wireless terminal 1, the ground conductor 12 is connected to a reference voltage terminal of the charger 92 as a ground plane for the power supply circuit. The ground conductor 12 and the metal casing 30 are electrically connected, with the contact pins 13 and the contact pads 31 interposed therebetween.

In this situation, if the charger 92 that is insufficiently insulated from the commercial power supply 90 is connected to the mobile wireless terminal 1, a voltage to ground V is applied to the metal casing 30 and this creates a risk of electric shock. For example, the voltage to ground V may reach about 340 V, which is the maximum instantaneous value of an alternating-current voltage whose effective value is about 240 V.

Second Comparative Example

The inventors of preferred embodiments of the present invention first examined the following mobile wireless terminal to solve this problem. The mobile wireless terminal will now be described as a second comparative example.

Figure 4:
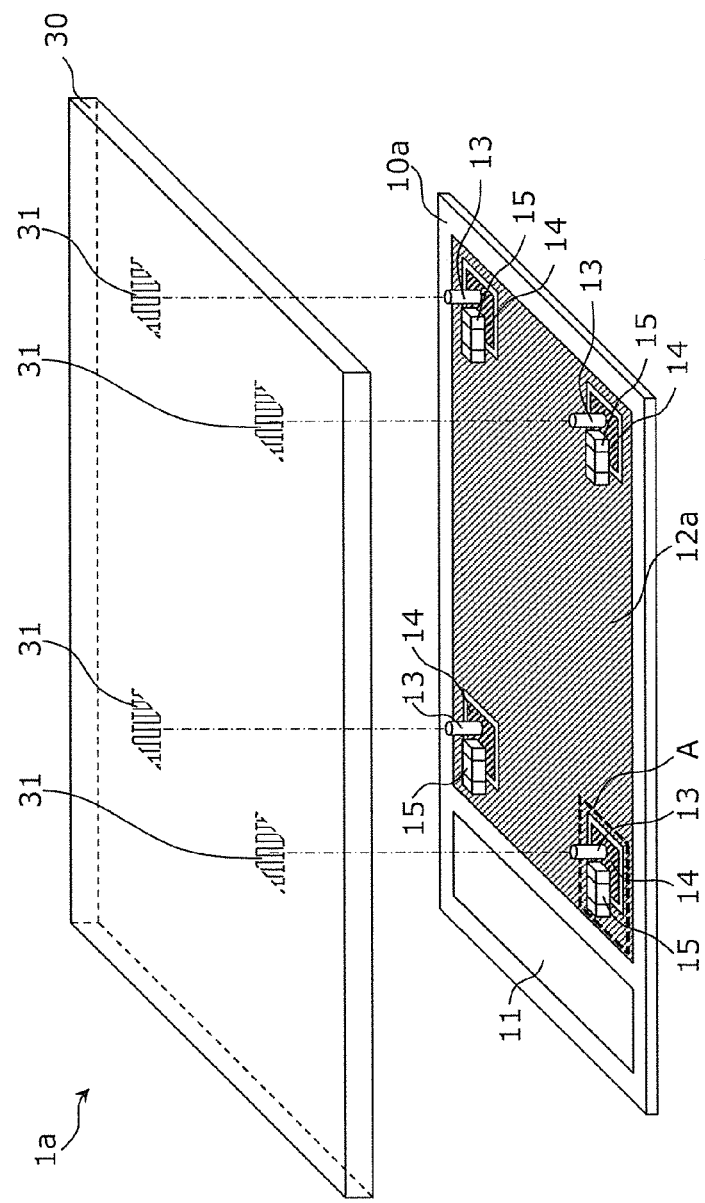
FIG. 4 is an exploded perspective view illustrating a structure of a mobile wireless terminal according to a second comparative example.

FIG. 4 is an exploded perspective view illustrating a structure of a mobile wireless terminal 1a according to the second comparative example. Note that the resin casing 20 is not shown in FIG. 4. The mobile wireless terminal 1a differs from the mobile wireless terminal 1 of FIG. 2 in the following ways. Land conductors 14 spaced from a ground conductor 12a are arranged on a printed wiring board 10a. The contact pins 13 are secured to and electrically connected to the land conductors 14, not to the ground conductor 12a. Capacitors 15 that connect the ground conductor 12a to the land conductors 14 are added.

Examples of the capacitors 15 include, but are not particularly limited to, multilayer ceramic capacitors each including a plurality of pairs of internal electrodes in a ceramic body. Since the multilayer ceramic capacitors can each be configured as a compact low-profile component and have high reliability and capacitance accuracy, it is possible to achieve both good antenna characteristics and compactness.

Figure 5:
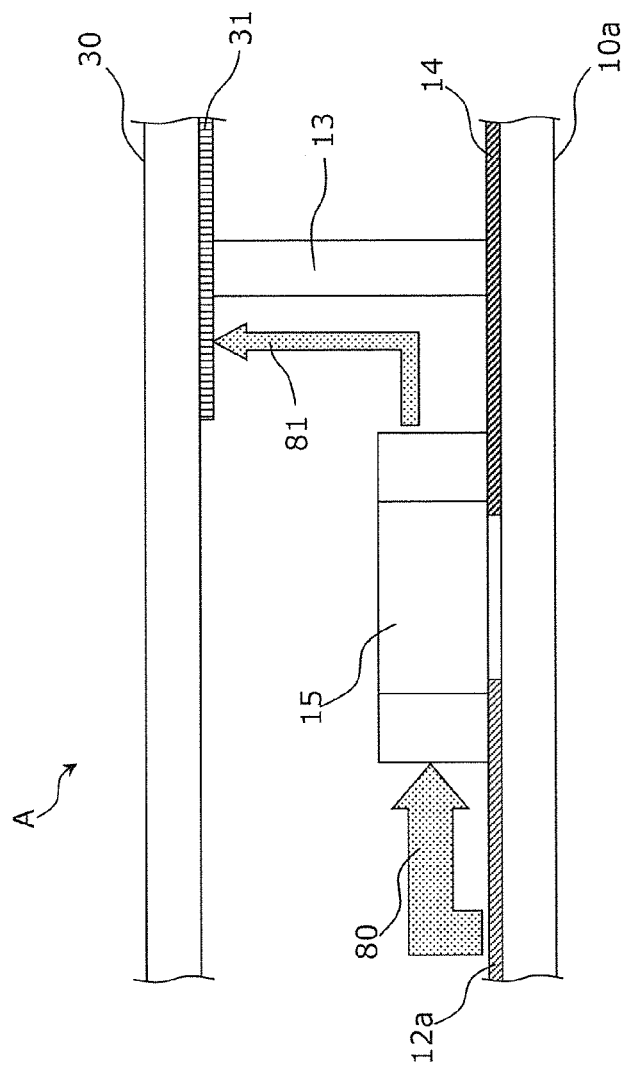
FIG. 5 is an enlarged side view of a main portion of the mobile wireless terminal according to the second comparative example.

FIG. 5 is an enlarged side view illustrating a structure of a main portion of the mobile wireless terminal 1a, and corresponds to portion A of FIG. 4. FIG. 5 illustrates leakage currents 80 and 81 from the commercial power supply, along with the elements included in portion A of FIG. 4.

Figure 6:
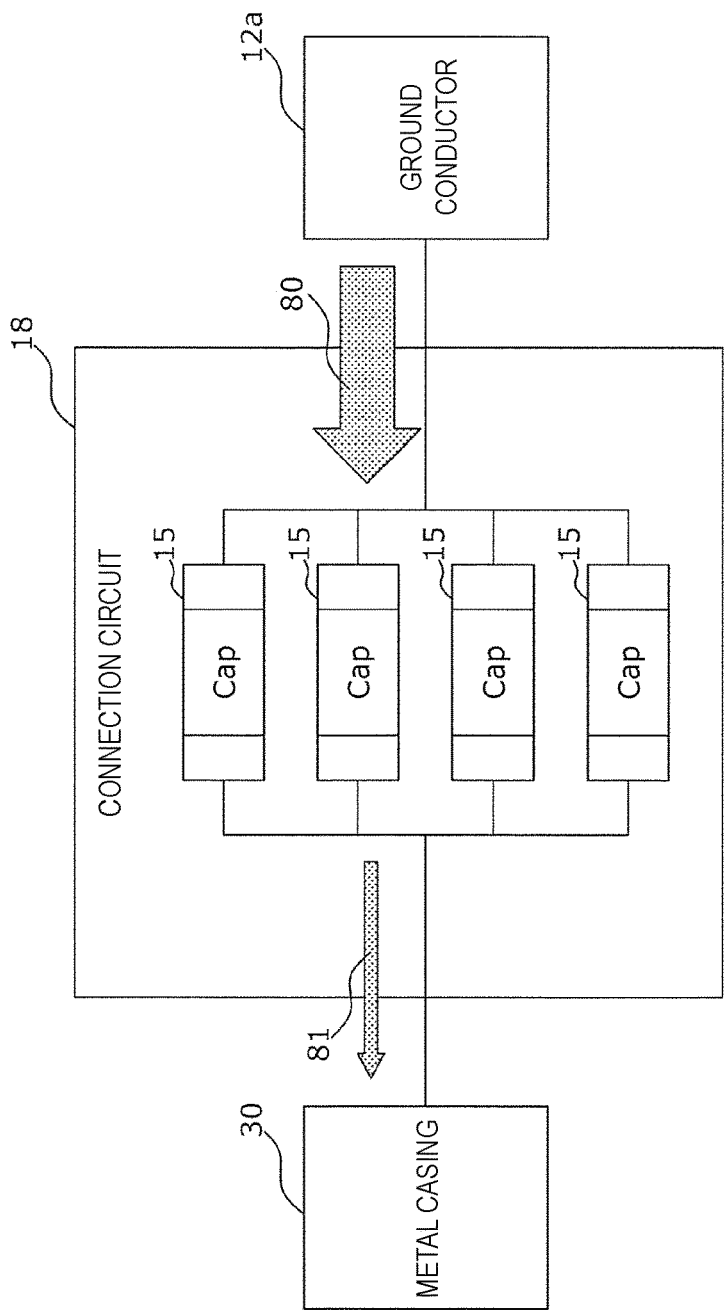
FIG. 6 is a circuit diagram equivalently illustrating a connection circuit according to the second comparative example.

FIG. 6 is a circuit diagram equivalently illustrating a connection circuit 18 that connects the metal casing 30 and the ground conductor 12a in the mobile wireless terminal 1a. As illustrated in FIG. 6, the connection circuit 18 includes four capacitors (Cap) 15 connected in parallel.

As illustrated in FIGS. 5 and 6, since the metal casing 30 and the ground conductor 12a are connected by the capacitors 15, an impedance between the metal casing 30 and the ground conductor 12a can be set high for a leakage current of low frequency from the commercial power supply, and can be set low for an antenna current of high frequency.

Thus, since the antenna current flowing through the ground conductor 12a is able to be favorably transmitted to the metal casing 30, good antenna characteristics are achieved. Also, since the leakage current 80 flowing from the commercial power supply into the ground conductor 12a is attenuated to the leakage current 81 while being transmitted to the metal casing 30, the risk of electric shock is reduced.

With the mobile wireless terminal 1a, as described above, it is possible to achieve good antenna characteristics while reducing the risk of electric shock.

However, the inventors of preferred embodiments of the present invention discovered that the mobile wireless terminal 1a had the following problems. Specifically, when a surge voltage is repeatedly applied to the capacitors 15, the resulting degradation in the capacitance of the capacitors 15 leads to increased impedance to the flow of antenna current, and deteriorates the antenna characteristics. Also, the resulting short-circuit fault causes a loss of the anti-electric shock function. The surge voltage is a voltage generated, for example, by electrostatic discharge from a human body and ranging from about several thousands of volts (V) to about tens of thousands and several thousands of volts (V).

As a result of various efforts to develop a mobile wireless terminal that is capable of maintaining good antenna characteristics over the long term while reducing the risk of electric shock, the inventors of preferred embodiments of the present invention conceived of and developed the following mobile wireless terminals.

First Preferred Embodiment

Figure 7:
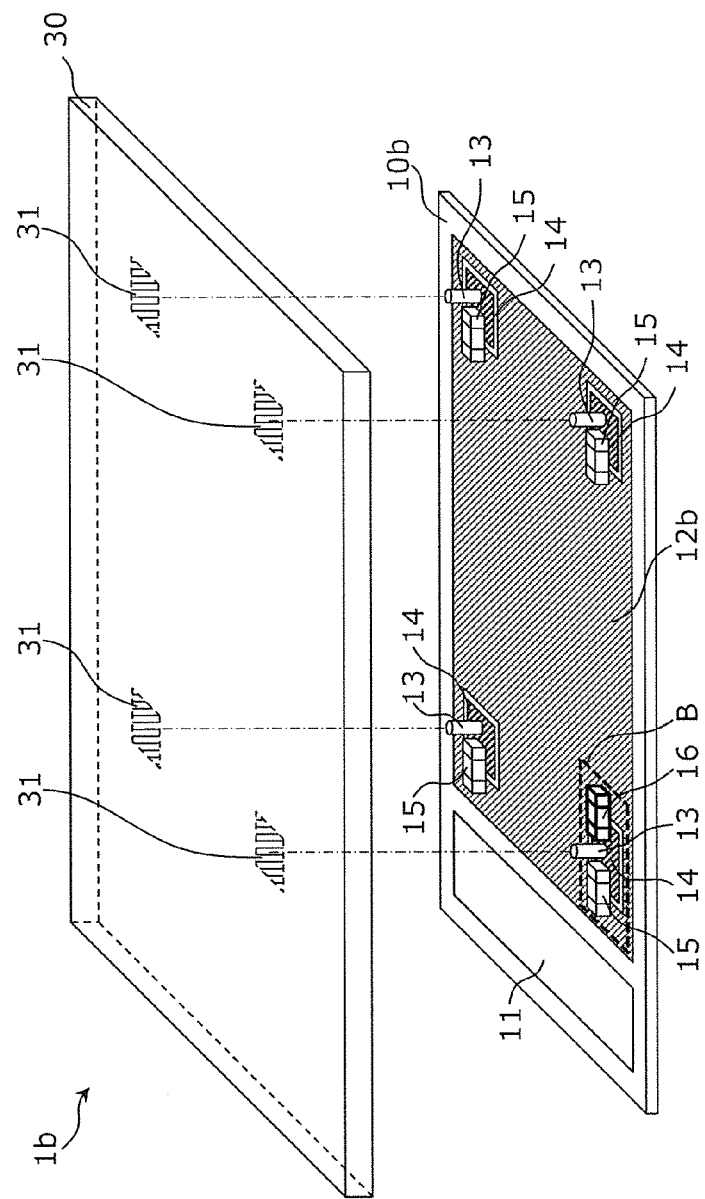
FIG. 7 is an exploded perspective view illustrating a structure of a mobile wireless terminal according to a first preferred embodiment of the present invention.

FIG. 7 is an exploded perspective view illustrating a structure of a mobile wireless terminal 1b according to a first preferred embodiment of the present invention. The mobile wireless terminal 1b differs from the mobile wireless terminal 1a of FIG. 4 in the structure and configuration of portion B. Specifically, an overcurrent protective element 16 that connects a ground conductor 12b and the land conductor 14 is included in portion B of a printed wiring board 10b. The overcurrent protective element 16 is thus connected to both of the ground conductor 12b and the metal casing 30 through the contact pin 13 and the land conductor 14, which are shared with the capacitor 15.

The overcurrent protective element 16 is an element having a nonlinear resistance value with respect to an applied voltage. Specifically, the overcurrent protective element 16 is a two-terminal element having a resistance value that drops abruptly in response to an applied voltage higher than or equal to the operating voltage exceeding the maximum instantaneous value of the commercial power supply voltage. Examples of the overcurrent protective element 16 include, but are not particularly limited to, a discharge gap overcurrent protective element including a pair of discharge electrodes in a ceramic body. Since the overcurrent protective element of the discharge gap type is able to be structured as an ultra-low capacitance element (e.g., an element having a capacitance several orders of magnitude smaller than that of the capacitors), a mobile wireless terminal is able to be provided, which is capable of protecting the capacitors without impairing the antenna characteristics.

Figure 8:
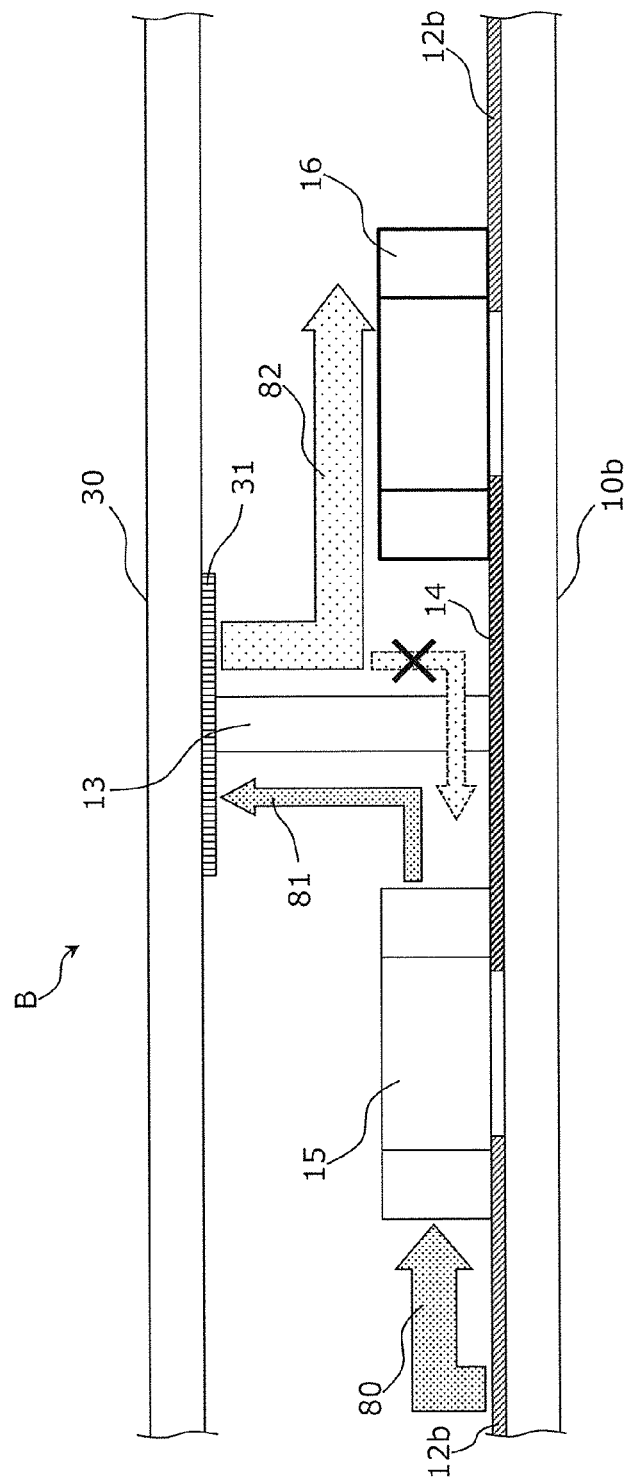
FIG. 8 is an enlarged side view of a main portion of the mobile wireless terminal according to the first preferred embodiment of the present invention.

FIG. 8 is an enlarged side view illustrating a structure of a main portion of the mobile wireless terminal 1b, and corresponds to portion B of FIG. 7. FIG. 8 illustrates the leakage currents 80 and 81 from the commercial power supply and a surge current 82, along with the elements included in portion B of FIG. 7.

Figure 9:
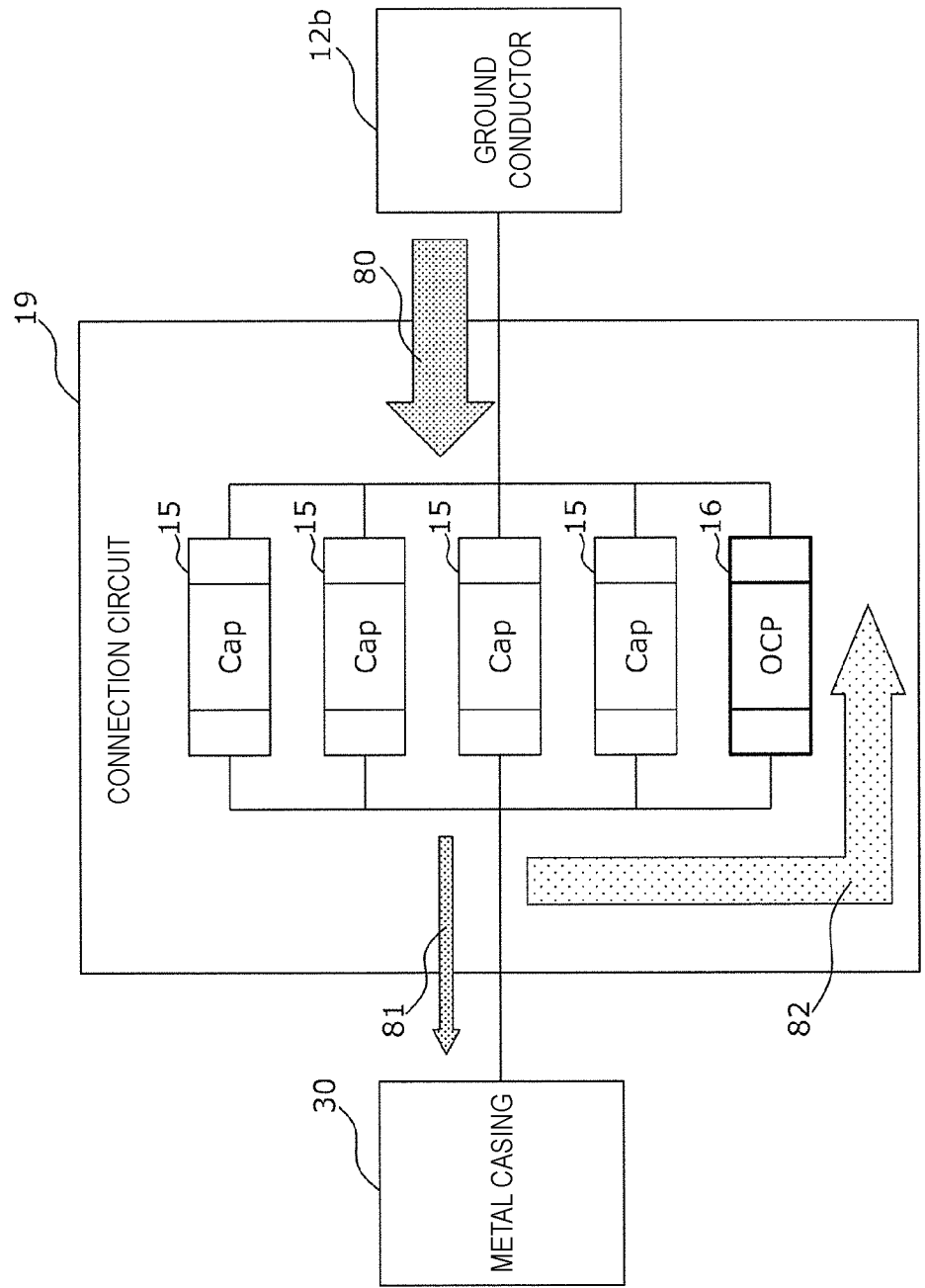
FIG. 9 is a circuit diagram equivalently illustrating a connection circuit according to the first preferred embodiment of the present invention.

FIG. 9 is a circuit diagram equivalently illustrating a connection circuit 19 that connects the metal casing 30 and the ground conductor 12b in the mobile wireless terminal 1b. As illustrated in FIG. 9, the connection circuit 19 includes four capacitors (Cap) 15 connected in parallel and one overcurrent protective element (OCP) 16.

As illustrated in FIGS. 8 and 9, the overcurrent protective element 16 is connected to the metal casing 30 and the ground conductor 12b in parallel with the four capacitors 15. Therefore, when a surge voltage is applied to the metal casing 30, the overcurrent protective element 16 operates (or conducts) to allow the surge current 82 resulting from the surge voltage to flow through the overcurrent protective element 16 to the ground conductor 12b. The capacitors 15 are thus protected from the surge voltage.

The overcurrent protective element 16 has an operating voltage higher than the maximum instantaneous value of the commercial power supply voltage, and does not operate in response to the leakage current 80 from the commercial power supply. Therefore, the overcurrent protective element 16 protects the capacitors 15 from the surge voltage without deteriorating the anti-electric shock function. In the second comparative example described above, the degradation in the capacitance of the capacitors 15 leads to increased impedance to the flow of antenna current, and deteriorates the antenna characteristics. Also, the resulting short-circuit fault causes a loss of the anti-electric shock function. This problem with the second comparative example is solved. A mobile wireless terminal is thus provided, which is capable of maintaining good antenna characteristics over the long term while reducing the risk of electric shock caused by leakage current from the commercial power supply.

Modification of First Preferred Embodiment

FIG. 7 illustrates an example where, in portion B, the overcurrent protective element 16 is preferably connected to both of the ground conductor 12b and the metal casing 30 through the land conductor 14 and the contact pin 13, which are shared with the capacitor 15. However, the configuration of the overcurrent protective element 16 is not limited to this.

Figure 10:
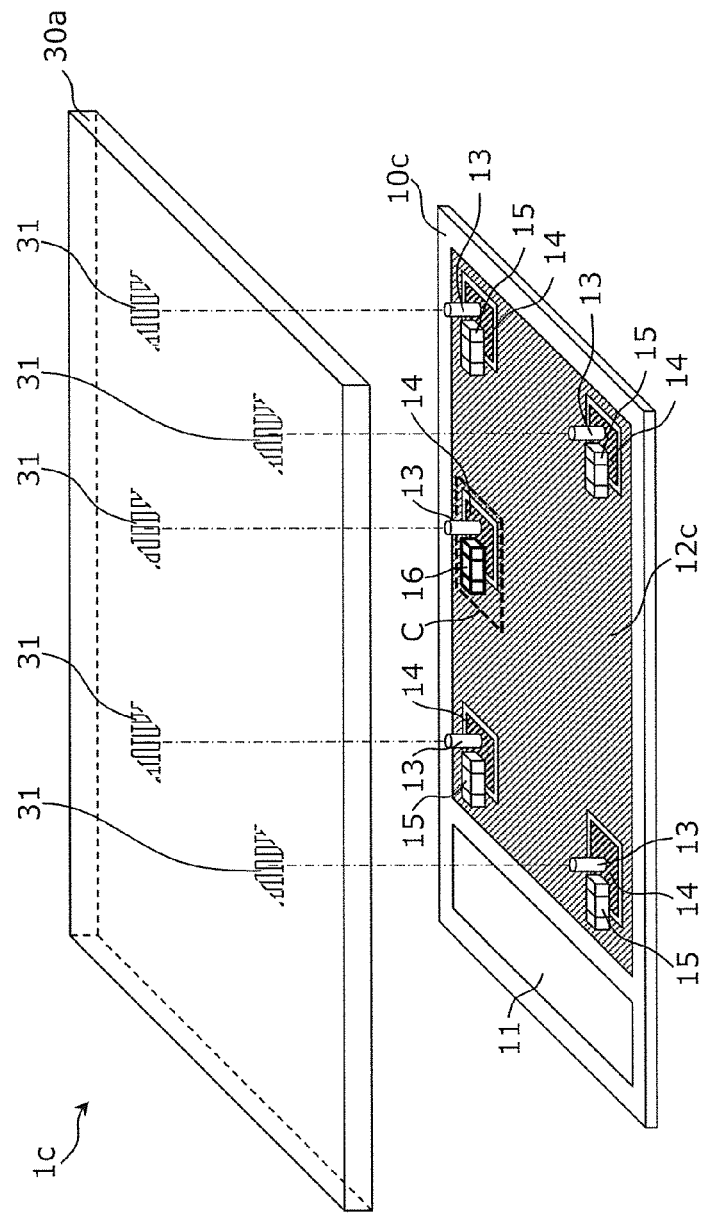
FIG. 10 is an exploded perspective view illustrating a structure of a mobile wireless terminal according to a modification of the first preferred embodiment of the present invention.

FIG. 10 is an exploded perspective view illustrating a structure of a mobile wireless terminal 1c according to a modification of the first preferred embodiment. The mobile wireless terminal 1c differs from the mobile wireless terminal 1b of FIG. 7 in the configuration of portion C. Specifically, the contact pin 13, the land conductor 14, and the overcurrent protective element 16 that connects the contact pin 13 and the land conductor 14 are included portion C of a printed wiring board 10c. Another contact pad 31 is added to a metal casing 30a at a position opposite to portion C. The overcurrent protective element 16 is thus connected to both of a ground conductor 12c and the metal casing 30 through a dedicated contact pin 13 and land conductor 14.

A connection circuit that connects the ground conductor 12c and the metal casing 30 in the mobile wireless terminal 1c is equivalent to the connection circuit 19 illustrated in FIG. 9. Therefore, with the mobile wireless terminal 1c, as in the case of the mobile wireless terminal 1b, a mobile wireless terminal is provided, which is capable of maintaining good antenna characteristics over the long term while reducing the risk of electric shock caused by leakage current from the commercial power supply.

To verify the effectiveness of the overcurrent protective element 16, the inventors of preferred embodiments of the present invention conducted a capacitor degradation test to examine the degradation of capacitors caused by electrostatic discharge. The following will describe the test.

Figure 11:
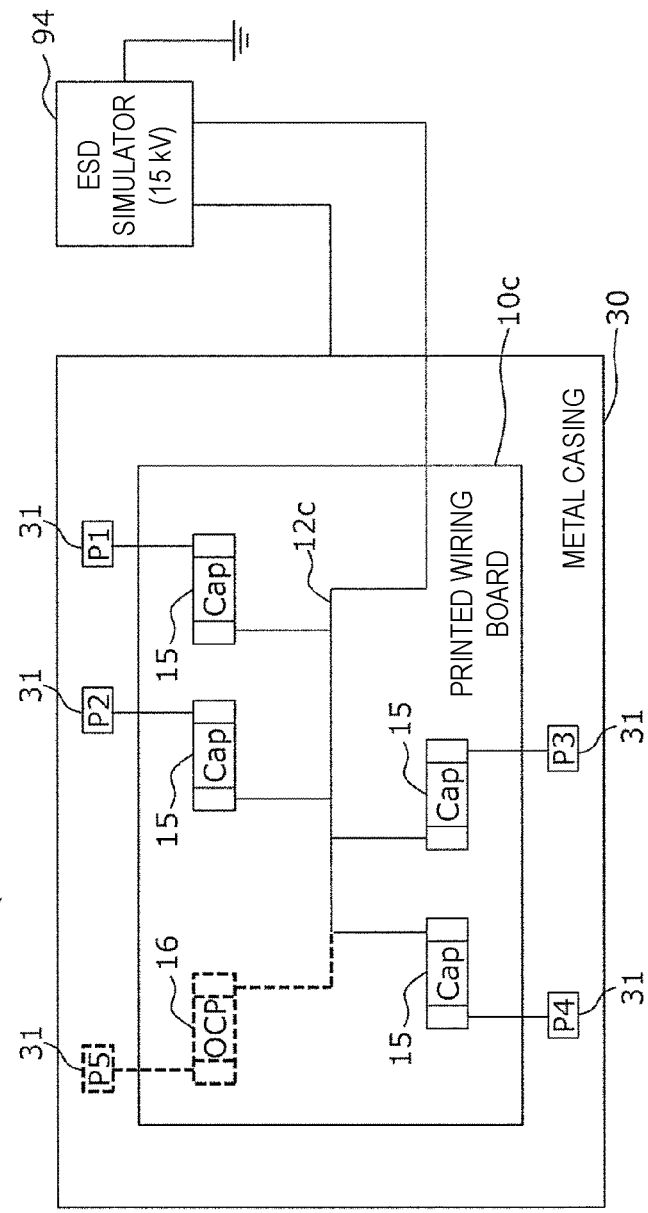
FIG. 11 illustrates a capacitor degradation test environment.

FIG. 11 illustrates an environment for the capacitor degradation test. Test samples for both of a comparative example and a preferred embodiment were prepared. The test sample for the comparative example was produced by intentionally removing the overcurrent protective element (OCP) 16 from the mobile wireless terminal 1c of FIG. 10, and the test sample for the present preferred embodiment was the mobile wireless terminal 1c including the overcurrent protective element 16. Multilayer ceramic capacitors with a capacitance of about 100 pF and a breakdown voltage of about 100 V were used as the capacitors (Cap) 15, and a discharge gap overcurrent protective element having an operating voltage of about 500 V was used as the overcurrent protective element 16.

In accordance with the test standard IEC 61000-4-2, for both of the comparative example and the present preferred embodiment, a test voltage of about 15 kV from an electrostatic discharge (ESD) simulator 94 was applied between the ground conductor 12c and the metal casing 30 multiple times using contact discharge. In the initial state and each time the test voltage was applied a predetermined number of times, the contact pins 13 were removed from the metal casing 30 to measure the capacitance of each capacitor 15.

FIG. 12 shows a test result on the mobile wireless terminal according to the comparative example. In FIG. 12, shaded cells indicate that there was a degradation of about 10% or more from the initial capacitance. As shown in FIG. 12, all of the capacitors 15 were degraded by the application of the test voltage thereto 50 times to 300 times, and failed to maintain the initial capacitance.

FIG. 13 shows a test result on the mobile wireless terminal according to the present preferred embodiment. As shown in FIG. 13, all of the capacitors 15 successfully maintained the initial capacitance after the test voltage was applied 500 times.

The results verified that the capacitors 15 are protected from a surge voltage by the overcurrent protective element 16.

Second Preferred Embodiment

A second preferred embodiment of the present invention describes favorable conditions for the capacitance of the capacitors 15 and the capacitance of the overcurrent protective element 16.

To achieve good antenna characteristics, the capacitance of the overcurrent protective element 16 is preferably smaller than the capacitance of the capacitors 15. This is because of the following reasons.

Figure 14:
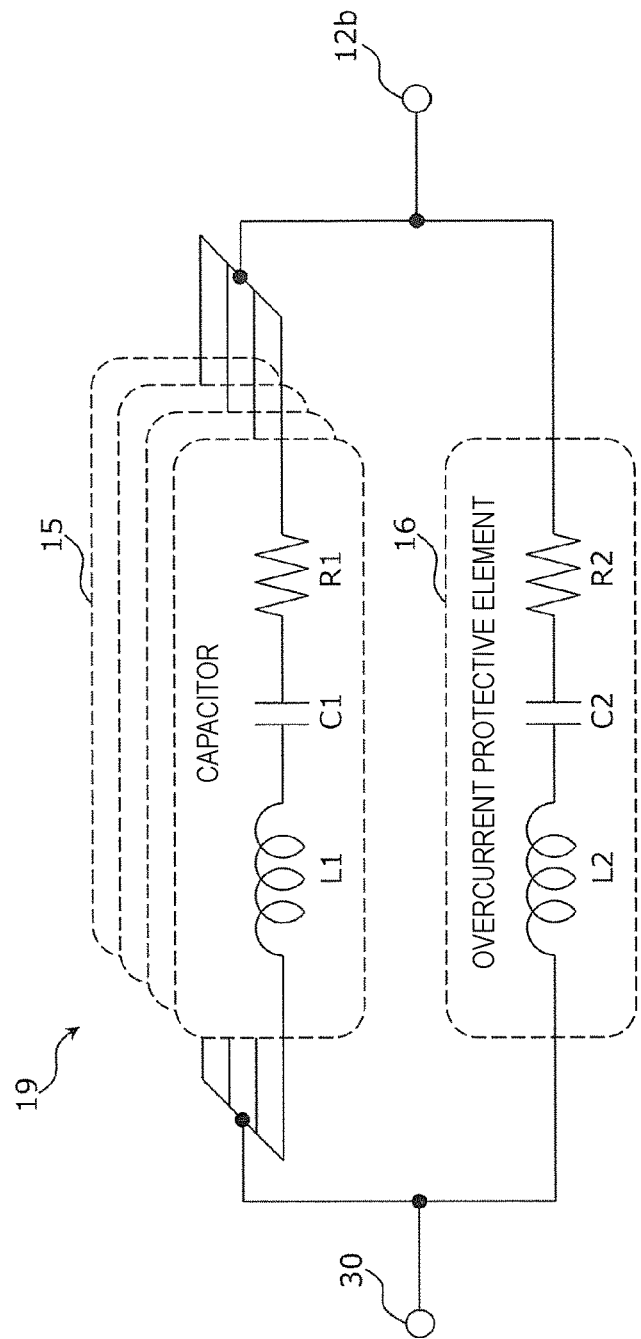
FIG. 14 is a circuit diagram illustrating an equivalent connection circuit for high-frequency signals according to a second preferred embodiment of the present invention.

FIG. 14 is a circuit diagram illustrating an equivalent connection circuit for antenna current, and corresponds to the connection circuit 19 of FIG. 9. As illustrated in FIG. 14, for antenna current, the capacitors 15 each equivalently include such components as an inductor L1, a capacitance C1, and a resistor R1, for example, and the overcurrent protective element 16 equivalently includes such components as an inductor L2, a capacitance C2, and a resistor R2, for example.

The overcurrent protective element 16 preferably includes a resistive component larger than that of the capacitors (R2>R1), and thus, has a smaller quality factor represented by $Q=\omega L/R$, where $\omega$ is an angular frequency of antenna current. Therefore, a loss of antenna current in the overcurrent protective element 16 is larger than a loss of antenna current in the capacitors 15.

Accordingly, by making the capacitance C2 of the overcurrent protective element 16 smaller than the capacitance C1 of the capacitors 15 (C2<C1), the impedance of the overcurrent protective element 16 to the flow of antenna current is made larger than that of the capacitors 15. For example, using a discharge gap overcurrent protective element that is able to be structured and configured as an ultra-low capacitance element (e.g., an element having a capacitance several orders of magnitude smaller than that of the capacitors 15) as the overcurrent protective element 16, is preferable.

Thus, since an antenna current transmitted from the ground conductor 12b to the metal casing 30 primarily flows to the capacitors 15, a loss of antenna current in the overcurrent protective element 16 is reduced and good antenna current is achieved.

An upper limit of the capacitance of the capacitors 15 providing the anti-electric shock function will now be described.

Figure 15:
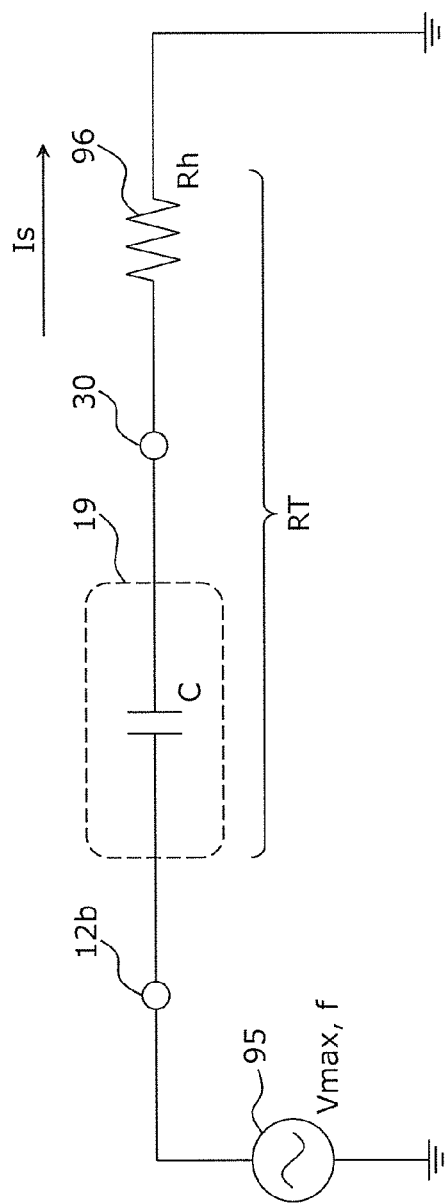
FIG. 15 is a circuit diagram illustrating an evaluation circuit according to the second preferred embodiment of the present invention.

FIG. 15 is a circuit diagram illustrating an evaluation circuit used to evaluate the capacitance of the capacitors 15. The evaluation circuit illustrated in FIG. 15 is defined by connecting, in series, a commercial power supply 95, the ground conductor 12b, the connection circuit 19, the metal casing 30, and a human body 96. In the state shown in FIG. 15, a user touches the metal casing 30 to which a leakage voltage from the commercial power supply is applied. The commercial power supply 95 and the human body 96 are connected to the ground.

The commercial power supply 95 generates an alternating-current voltage having a maximum instantaneous value Vmax and a frequency f. The connection circuit 19 has a combined capacitance C of the capacitors 15 and the overcurrent protective element 16. The human body 96 has a resistance Rh. A current path defined by the connection circuit 19 and the human body 96 has a combined impedance RT.

A current Is flowing through the evaluation circuit configured as described above is expressed by Equation 1.

$$Is = \frac{V\max}{RT} = \left(\frac{V\max}{Rh + \frac{1}{2\pi f C}}\right) \quad \text{Equation 1}$$

Here, the resistance Rh is a resistance value 1 kΩ of the human body in a wet state, and the current Is is a minimum value 1 mA of current the human body can detect. The maximum instantaneous value Vmax of the commercial power supply 95 is about 340 V, and the frequency f is about 60 Hz. Substituting these values into Equation 1 gives Equation 2.

$$1 \times 10^{-3} = \left(\frac{340}{1 \times 10^3 + \frac{1}{2 \times 3.14 \times 60 C}}\right) \quad \text{Equation 2}$$

Solving Equation 2 with respect to C gives $C=7.75 \times 10^3$ (pF). Therefore, by making the combined capacitance C of the connection circuit equal to about $7.75 \times 10^3$ (pF) or less, the current Is flowing through the human body 96 is able to be limited to 1 mA or less even if a leakage voltage from the commercial power supply 95 is applied to the metal casing 30.

In the example of the connection circuit 19, when the combined capacitance C is considered as a parallel capacitance of the four capacitors 15 by ignoring the capacitance of the overcurrent protective element 16, the upper limit of the capacitance C1 of the capacitors 15 may be expressed as $C/4=1.94 \times 10^3$ (pF).

The value of the capacitance C1 of the capacitors 15 is not specifically limited to the evaluation example described above. For example, even when various parameters, such as an allowable current value, the maximum instantaneous value of the commercial power supply for each country or region, and the number of capacitors 15 included in the connection circuit, for example, are different, an appropriate upper limit of the capacitance C1 of the capacitors 15 is able to be determined based on the evaluation equations described above.

Third Preferred Embodiment

In a third preferred embodiment of the present invention, a preferable arrangement of the capacitors 15 and the overcurrent protective element 16 is described, which takes into account the distribution of antenna current in the ground conductor 12.

Figure 16:
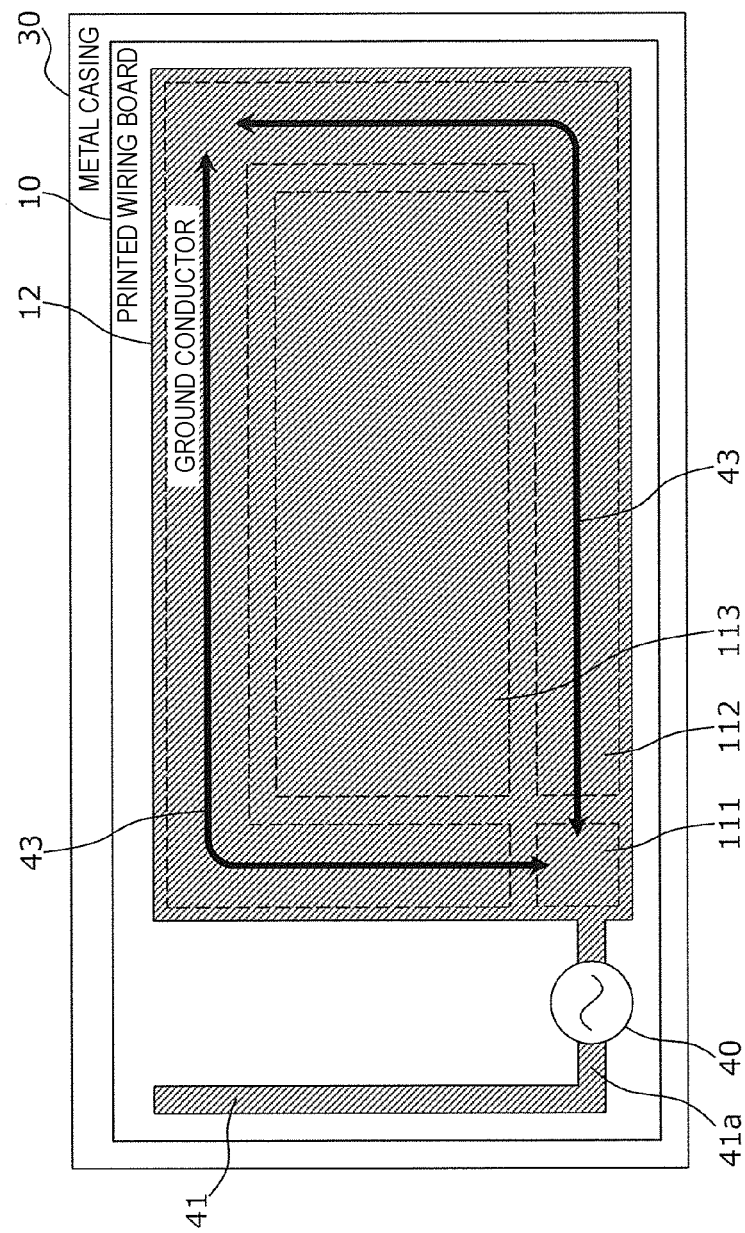
FIG. 16 is a top view illustrating an example of antenna current flowing through a ground conductor according to a third preferred embodiment of the present invention.
Figure 17:
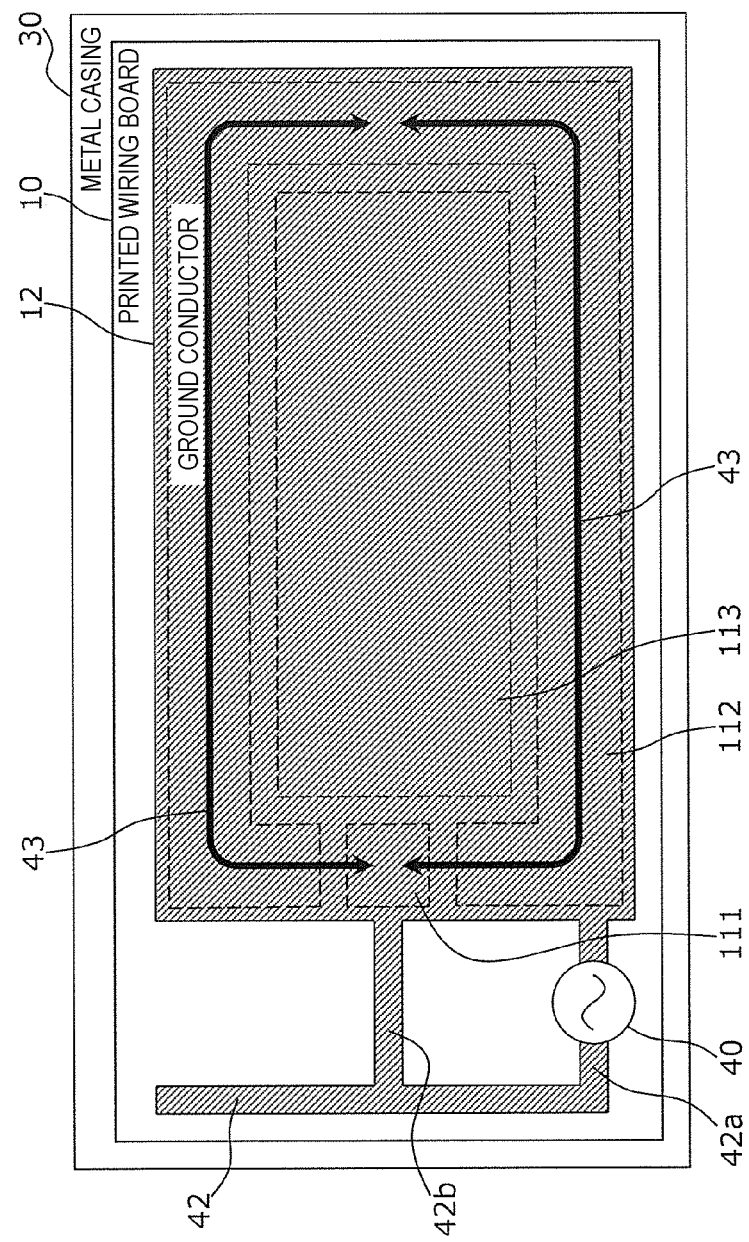
FIG. 17 is a top view illustrating an example of antenna current flowing through a ground conductor according to a third preferred embodiment of the present invention.

FIGS. 16 and 17 are top views each illustrating an example of antenna current flowing through the ground conductor 12. The metal casing 30 is disposed opposite the ground conductor 12. For simplicity and clarity, FIGS. 16 and 17 do not show the contact pins, the land conductors, the capacitors, and the overcurrent protective element.

In the examples of FIGS. 16 and 17, an inverted-L antenna conductor 41 or an inverted-F antenna conductor 42, for example, is preferably connected to one end of a feeder circuit 40, and the ground conductor 12 is connected to the other end of the feeder circuit 40. An antenna current is supplied to each of the antenna conductors 41 and 42 and the ground conductor 12 from the feeder circuit 40 disposed near the base of a corresponding one of feeder lines 41a and 42a of the antenna conductors 41 and 42.

The antenna current output from the feeder circuit 40 flows along a path 43 in the ground conductor 12. Generally, when the length of the outer periphery of the ground conductor 12 is less than or equal to about λ/2 of the resonant frequency of the antenna including the wavelength shortening effect, the antenna current is maximized at around the node between the ground conductor 12 and the feeder line 41a of the inverted-L antenna conductor 41 in FIG. 16, and maximized at around the node between the ground conductor 12 and a short-circuit line 42b of the antenna conductor 42 in FIG. 17.

An explanation of a preferable arrangement of the capacitors and the overcurrent protective element continues below, which takes into account the distribution of antenna current in the ground conductor 12.

For the purpose of illustration, a region including the maximum point of antenna current in the ground conductor 12 is defined as a first region 111, a region including the path 43 of the antenna current is defined as a second region 112, and the other region is defined as a third region 113. Note that the first region 111, the second region 112, and the third region 113 indicate locations in the ground conductor 12, and the ground conductor 12 is not actually divided.

FIGS. 18 to 21 are top views each illustrating an arrangement of the capacitors and the overcurrent protective element. In each of FIGS. 18 to 21, circled reference characters C represent capacitors, and circled reference character E represents an overcurrent protective element. The capacitors and the overcurrent protective element are each connected to the ground conductor 12 and the metal casing 30 at the location of the corresponding reference character.

As illustrated in FIGS. 18 to 21, a capacitor may preferably be connected to the first region 111 and a region in the metal casing 30 opposite to the first region 111. That is, in the casing, a portion of the ground conductor closest to the feeder circuit 40 is preferably connected through the capacitor to the metal casing.

In this configuration, the capacitor connects a region in the ground conductor 12 where antenna current is largest to the metal casing 30. Since this allows the antenna current in the ground conductor 12 to be efficiently transmitted to the metal casing 30, a larger amount of antenna current is supplied to the metal casing 30 and good antenna characteristics are achieved.

As illustrated in FIGS. 18 to 21, another capacitor may preferably be connected to the second region 112 and a region in the metal casing 30 opposite to the second region 112.

In this configuration, the capacitor having a high quality factor connects a region in the ground conductor 12 where antenna current is large to the metal casing 30. Since this allows the antenna current in the ground conductor 12 to be efficiently transmitted to the metal casing 30, a larger amount of antenna current is supplied to the metal casing 30 and good antenna characteristics are achieved.

Figure 18:
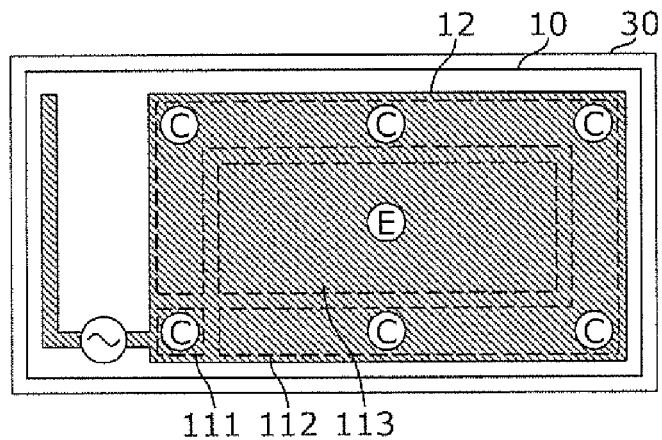
FIG. 18 is a top view illustrating an arrangement of capacitors and an overcurrent protective element according to the third preferred embodiment of the present invention.
Figure 19:
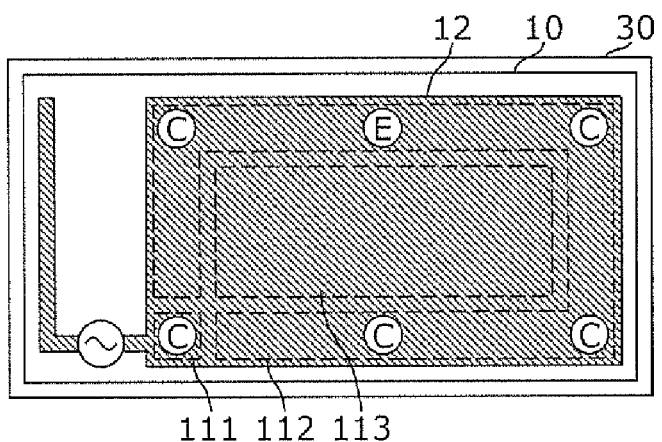
FIG. 19 is a top view illustrating another arrangement of the capacitors and the overcurrent protective element according to the third preferred embodiment of the present invention.
Figure 20:
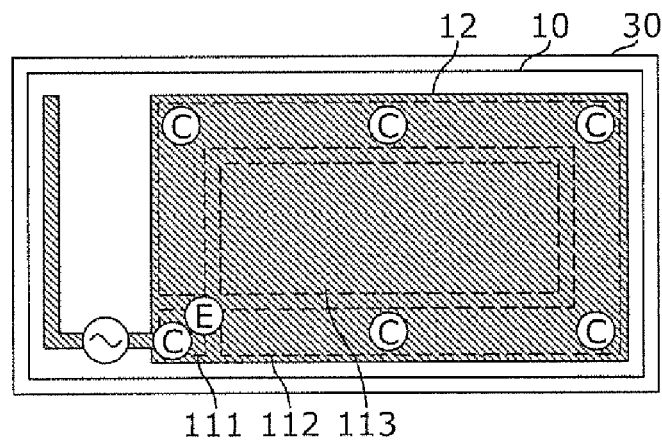
FIG. 20 is a top view illustrating another arrangement of the capacitors and the overcurrent protective element according to the third preferred embodiment of the present invention.
Figure 21:
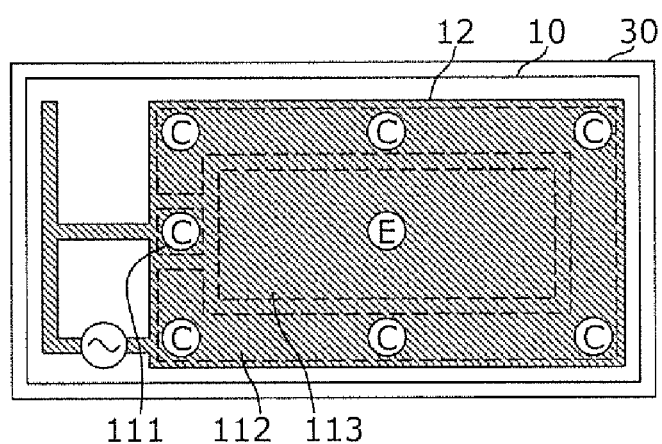
FIG. 21 is a top view illustrating another arrangement of the capacitors and the overcurrent protective element according to the third preferred embodiment of the present invention.

As illustrated in FIGS. 18 and 21, the overcurrent protective element may preferably be connected to the third region 113 and a region in the metal casing 30 opposite to the third region 113.

In this configuration, the overcurrent protective element connects a region in the ground conductor 12 where antenna current is small to the metal casing 30. The overcurrent protective element is thus able to protect the capacitors from a surge voltage without interfering with the capacitor arrangement designed to achieve good antenna characteristics.

Although the mobile wireless terminals according to preferred embodiments of the present invention have been described, the present invention is not limited to the individual preferred embodiments. Various modifications made to the preferred embodiments by those skilled in the art and combinations of elements in different preferred embodiments may also be included in the range of one or more of the preferred embodiments of the present invention without departing from the scope of the present invention.

Preferred embodiments of the present invention are applicable to mobile wireless terminals including a metal casing, such as smartphones and tablet PCs, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A mobile wireless terminal comprising:
   a metal casing;
   a printed wiring board disposed in the metal casing and including a ground conductor thereon, the ground conductor defining a ground plane for both of a power supply circuit and an antenna;
   a capacitor connected to the metal casing and the ground conductor; and
   an overcurrent protective element connected to the metal casing and the ground conductor and having an operating voltage higher than a maximum instantaneous value of a commercial power supply voltage.

2. The mobile wireless terminal according to claim 1, wherein a capacitance of the overcurrent protective element is smaller than a capacitance of the capacitor.

3. The mobile wireless terminal according to claim 1, wherein the overcurrent protective element is a discharge gap overcurrent protective element including a pair of discharge electrodes in a ceramic body.

4. The mobile wireless terminal according to claim 1, wherein the capacitor is a multilayer ceramic capacitor including a plurality of pairs of internal electrodes in a ceramic body.

5. The mobile wireless terminal according to claim 1, wherein in the ground conductor, an amount of antenna current flowing through a region to which the capacitor is connected is greater than or equal to an amount of antenna current flowing through a region to which the overcurrent protective element is connected.

6. The mobile wireless terminal according to claim 1, wherein
   the metal casing and the ground conductor are opposite to each other; and
   when, in the ground conductor, a region including a maximum point of antenna current is defined as a first region, a region including a path of the antenna current is defined as a second region, and a remaining region is defined as a third region, the capacitor is connected to the first region and a region in the metal casing opposite to the first region.

7. The mobile wireless terminal according to claim 6, further comprising:
   another capacitor; wherein
   the another capacitor is connected to the second region and a region in the metal casing opposite to the second region.

8. The mobile wireless terminal according to claim 6, wherein the overcurrent protective element is connected to the third region and a region in the metal casing opposite to the third region.

9. The mobile wireless terminal according to claim 1, wherein an impedance between the metal casing and the ground conductor at a frequency of a current flowing through the antenna is lower than the impedance at a frequency of the commercial power supply voltage.

* * * * *